Oct. 21, 1930. B. A. GAYMAN Re. 17,838

SLEEVE FOR ROLLER BEARINGS

Original Filed Dec. 6, 1926

Inventor
Bert A. Gayman
by Arker & Carter
Attorneys.

Reissued Oct. 21, 1930

Re. 17,838

UNITED STATES PATENT OFFICE

BERT A. GAYMAN, OF SAN FRANCISCO, CALIFORNIA, ASSIGNOR TO LINK BELT COMPANY, OF CHICAGO, ILLINOIS, A CORPORATION OF ILLINOIS

SLEEVE FOR ROLLER BEARINGS

Original No. 1,699,330, dated January 15, 1929, Serial No. 152,744, filed December 6, 1926. Application for reissue filed August 14, 1929. Serial No. 385,769.

My invention relates to an improvement in sleeves for roller bearings and is particularly applicable in connection with the mounting of double roller bearings upon a shaft. My invention is an improvement upon the methods now in vogue which in general fall into two distinct types as follows:

First, the shaft is carefully finished at considerable expense by turning or grinding to very accurate dimensions to fit the standard anti-friction bearing. It is impossible to use this method for mounting anti-friction bearings on commercial shafting because commercial shafting varies considerably in diameter and a standard bearing would be either too small to be applied or too loose to fit shafting as ordinarily offered the trade.

Second, the anti-friction bearings are mounted on sleeves whose inside diameter is sufficiently greater than the outside diameter of the largest variation in the diameter of commercial shafting so that the sleeves are then clamped or otherwise fastened to the shaft. The clearance between the sleeves and the shaft, particularly when the shaft is undersize, may be sufficient to cause the failure of the sleeves from deflection or crystallization because the sleeves are anchored to the shaft outside the bearing and the load has to be transferred through the sleeves.

In carrying out my invention I propose to interpose between the inner race of each of the bearings and the shaft a sleeve having a tapered exterior surface, the inner periphery of the inner race having also a tapered surface conforming to the tapered exterior surface of the sleeve. The inside diameter of this sleeve is sufficiently large to pass over commercial size shafting and by drawing it through the tapered race the sleeve which has one or more slots to permit it to be wedged against the shaft by the inner race is made to clamp the shaft rigidly with the result that there is a continuous mass of metal interposed between the shaft and the race, the parts being all rigidly held together. Thus there is a direct contact and a direct transfer of the load from the shaft through the sleeve to the race or vice versa. Other objects will appear from time to time throughout the specification and claims.

My invention is illustrated more or less diagrammatically in the accompanying drawings, wherein—

Like parts are indicated by like characters throughout the specification and drawings.

Figure 1:
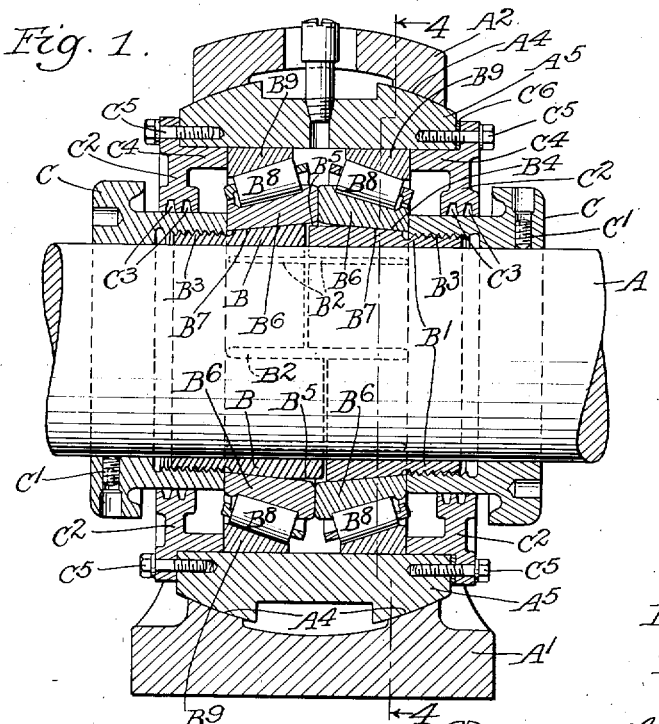
Figure 1 is a section on a plane parallel with the axis of the shaft.
Figure 2:
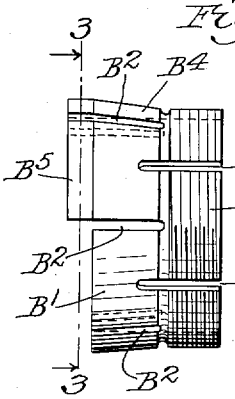
Figure 2 is a detail side elevation of one of the sleeves.
Figure 3:
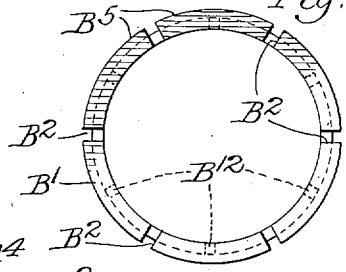
Figure 3 is a section along the line 3—3 of Figure 2.
Figure 4:
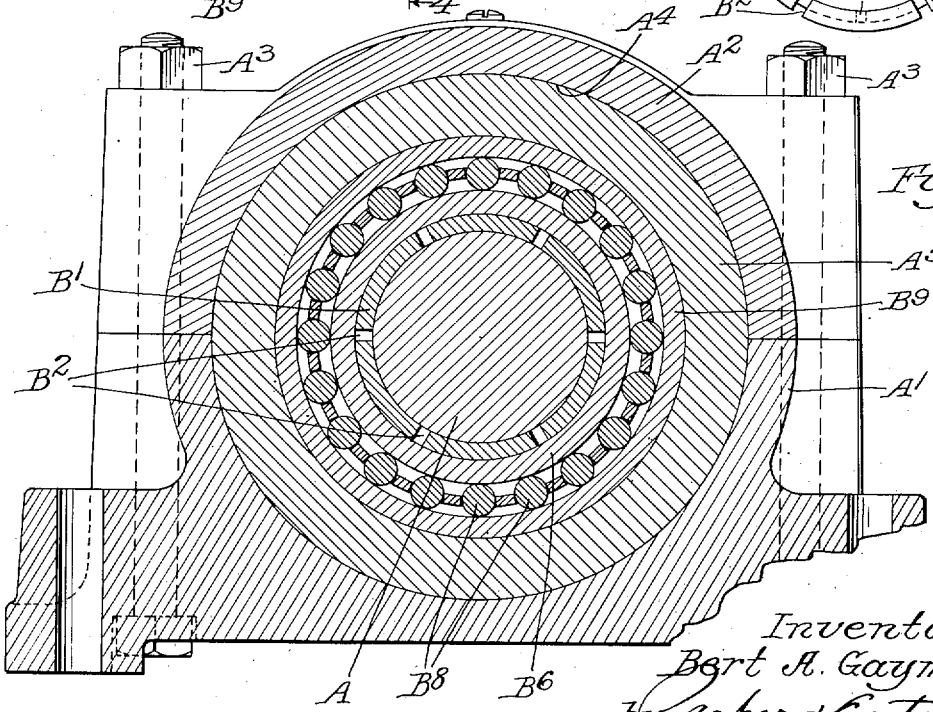
Figure 4 is a section along the line 4—4 of Figure 1.

A is the shaft, $A^1$ the lower portion of a pillow block, $A^2$ a bearing cap held in place by bolts $A^3$. The pillow block has an interior spherical surface $A^4$ in which the spherical bushing $A^5$ is permitted a certain amount of adjusting movement to prevent binding of the shaft and bearing. The inner periphery of this bushing $A^5$ is cylindrical and always in line with the shaft. B $B^1$ are wedging sleeves slotted at $B^2$ and $B^{12}$ with their outer ends threaded at $B^3$. The interior portion of each sleeve is cylindrical and conforms generally in diameter to the diameter of the shaft. The unthreaded portion of the sleeve has an outwardly inclined or tapered surface $B^4$. The slots $B^2$ $B^{12}$ are staggered or alternated so that both the threaded and the tapered portion is slotted and since these slots overlap, a very large degree of constriction of the sleeve is permitted. The number of the slots and the relation between the slots extending through the tapered portion and the threaded portion of the sleeve will of course vary depending on the size of the shaft, it being necessary to have such a number of these slots as will be sufficient to give the sleeve, however big it may be, sufficient compressibility so that it may accomplish its wedging, clamping, locking action. A portion of each sleeve has an extension $B^5$ extending beyond the largest diameter of the tapered portion so that the outer portion of each sleeve interlocks with a portion of the other whereby the relative rotation of the two sleeves is prevented. $B^6$, $B^6$ are inner roller bearing races having tapered inner surface $B^7$ to conform to and engage the exterior tapered surface on the sleeve. $B^8$, $B^8$ are roller members located between the inner races $B^6$ and outer races $B^9$, these outer races being in engagement with the cylindrical portion of the bushing $A^5$.

Associated with the outer ends of each of the sleeves B, $B^1$ are clamping nuts C. These clamping nuts surround the shaft and are interiorly threaded to engage the threaded portion $B^3$ on the sleeve. When these nuts are rotated with respect to the sleeves they engage the sides of the inner roller races and draw the sleeves axially through the tapered portion of the inner roller races, thereby constricting the tapered portion of the sleeve and clamping the race and sleeve rigidly in position on the shaft with the wedge portion of the sleeve directly interposed between the race and the shaft. The fact that the two sleeves interlock makes it possible to prevent the turning of the sleeve with the nut, and thus permit screwing of the nut into its position on the sleeve.

$C^1$ is a set screw whereby the nut may be locked on the shaft to prevent rotation after it has been tightened up. $C^2$ $C^2$ are filler rings closing the open ends of the bushings $A^5$. They have oil channels $C^3$ in working engagement with the outer periphery of the clamp nut, to seal the lubricant in the bearing, and cylindrical spacer means $C^4$ engaging the outer ends of the roller races to properly position them in the bushing and with respect to the inner race. Cap screws $C^5$ are provided to hold these filler rings in place and shims $C^6$ are used to correctly adjust the filler rings and prevent binding or losening of rollers between inner and outer races.

While I have illustrated my invention as applied to a self-aligning pillow block with its separate bushing, it is obvious that the bushing might be fixed in position instead of movable and adjustable as in the self-aligning pillow block or the bearing might be a bushing and still respond to the language used in the claims. I have shown a number of slots in the compressible sleeve. Perhaps for small bearings but a single bearing could be used, perhaps the slots might extend clear through the threaded or tapered portion or only the threaded or tapered portion might be used. In other words, any suitable slotting arrangement which makes it possible to give the compressible character to the tapered sleeve would be satisfactory and it is even possible that under some conditions a tapered sleeve of compressible material not slotted at all might be used.

I claim:

1. A mounting for anti-friction bearings and the like comprising a pair of opposed annular rings adapted to encircle a shaft, each ring having a central exteriorly tapered portion and a cylindrically threaded portion beyond the reduced end of the tapered portion, each ring also having a semi-circular cylindrical portion projecting beyond the large end of the tapered portion whereby the two semi-circular cylindrical portions may interlock to hold the rings against relative rotation, slots extending through the tapered portion of each ring to the threaded cylindrical portion alternately with slots extending through the threaded cylindrical portion into the tapered portion, interiorly tapered anti-friction bearing races adapted to engage the tapered portion of each of the sleeves, collars in threaded engagement with the threaded portion of the sleeves adapted to abut against the outer edges of the anti-friction bearing races to longitudinally displace the sleeves with respect to the bearing races to clamp the sleeves and races in position on the shaft.

2. An anti-friction bearing comprising two taper roller inner races abutting one another, these races being interiorly tapered with their larger diameters adjacent, a separate tapered sleeve, associated with each race, means interposed between the opposed ends of the sleeves and their adjacent races to draw the sleeves outwardly away from one another to wedge each within its own race.

3. An anti-friction bearing having two taper roller inner races adjacent one another, interiorly tapered with their larger diameters adjacent, a separate tapered sleeve, one associated with each race, means interposed between the opposed ends of the sleeves and their adjacent races to draw the sleeves outwardly away from one another to wedge each within its own race, said means comprising threaded cylindrical portions on the sleeves and nuts threaded thereon and engaging the outer ends of the bearing races, a container, outer bearing races therein, taper rollers interposed between the races and means for holding each outer race in place in the container, said means comprising rings, the nuts being for a portion of their length cylindrical and making a close running fit with the inner bore of the rings, and projecting beyond the end of the container.

4. In combination two adjacent taper roller bearings interiorly tapered with their major diameters adjacent two compression sleeves cylindrical to engage a shaft, exteriorly tapered to engage the tapered races and threaded at their outer ends where they extend beyond the races, a nut threaded on each such threaded outer end adapted to engage the outer side of the bearing race, and means for limiting relative rotation of the sleeves while permitting relative longitudinal displacement of the sleeves.

5. In combination two adjacent taper roller bearings interiorly tapered with their major diameters adjacent, two compression sleeves cylindrical to engage a shaft, exteriorly tapered to engage the tapered races and threaded at their outer ends where they extend beyond the races, a nut threaded on each such threaded outer end adapted to engage the outer side of the bearing race, the sleeves being free to permit longitudinal displacement in opposite direction with respect to the races with which they are respectively associated.

6. In combination two adjacent taper roller bearings interiorly tapered with their major diameters adjacent, two compression sleeves cylindrical to engage a shaft, exteriorly tapered to engage the tapered races and threaded at their outer ends where they extend beyond the races, a nut threaded on each such threaded outer end adapted to engage the outer side of the bearing race, and means for limiting relative angular displacement of the sleeve, the nuts projecting beyond the ends of the container.

7. In combination two adjacent taper roller bearings interiorly tapered with their major diameters adjacent, two compression sleeves cylindrical to engage a shaft, exteriorly tapered to engage the tapered races and threaded at their outer ends where they extend beyond the races, a nut threaded on each such threaded outer end adapted to engage the outer side of the bearing race, the sleeves being free to permit longitudinal displacement in opposite direction with respect to the races with which they are respectively associated, the nuts projecting beyond the ends of the container.

Signed at San Francisco, county of San Francisco, and State of California, this 30th day of April, 1930.

BERT A. GAYMAN.